Figure 1:
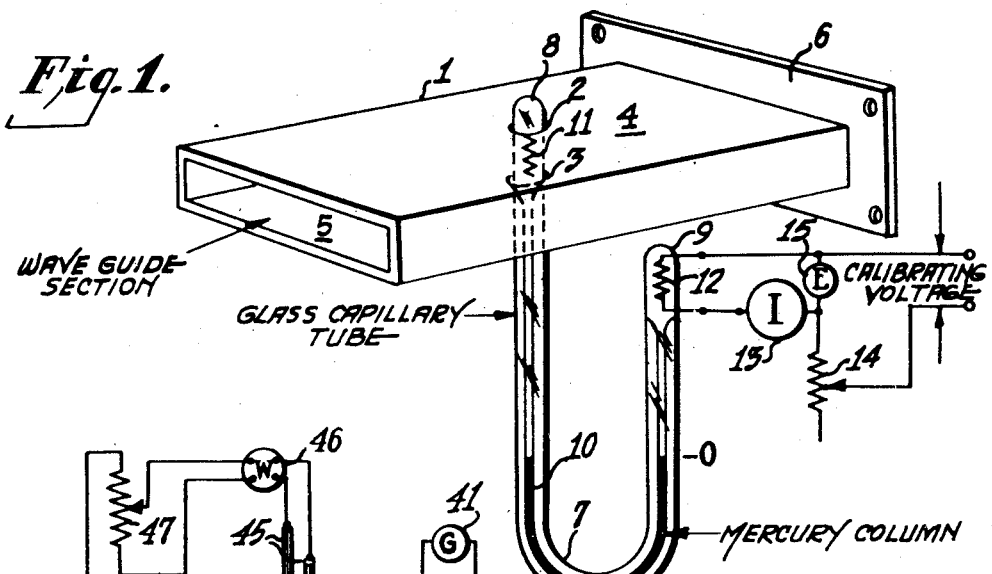

Sept. 9, 1947.  J. EVANS  2,427,094

SUPER-HIGH-FREQUENCY WATTMETER

Filed Aug. 31, 1943

Inventor
JOHN EVANS

Attorney

Patented Sept. 9, 1947

2,427,094

UNITED STATES PATENT OFFICE 2,427,094

SUPER-HIGH-FREQUENCY WATTMETER

John Evans, Kingston, N. J., assignor to Radio Corporation of America, a corporation of Delaware Application August 31, 1943, Serial No. 500,605

3 Claims. (Cl. 171—95)

This invention refers generally to super-high-frequency measuring apparatus and more particularly to wattmeters for measuring super-high-frequency energy in a wave guide transmission system.

Heretofore, various methods have been devised for measuring super-high-frequency power transmitted by wave guides. Many of these systems have involved measurements of standing wave reflections in the wave guide transmission system, or have involved separate detection of current and voltage components and means for combining these components to indicate the power. The principal disadvantage encountered with many of the known systems for ultra-high-frequency power measurement is that the apparatus is usually extremely frequency or phase selective whereby inaccurate power measurements result from slight frequency or phase deviations from some predetermined value. Two embodiments of the instant invention described in detail hereinafter comprise means for absorbing of the super-high-frequency energy transmitted by a wave guide transmission system, generating heat in response to said absorbed energy, operating indicating means in response to said generated heat, and calibrating said indicating means. The calibration may be made by an auxiliary heat generating device actuated by a calibrated power source.

A first embodiment of the invention comprises a short section of wave guide adapted to be connected to a wave guide transmission system. The wave guide transmission section includes two oppositely disposed apertures in the widest parallel faces of the wave guide section. A capillary U-tube, having enlarged blown portions in each end thereof, includes two similar resistive elements, one of which is disposed in each of the blown capillary tube portions. One of the resistive elements is disposed within the wave guide section by inserting one end of the U-tube in the oppositely disposed apertures whereby the resistive element acts as an efficient antenna for energy transmitted by the wave guide. Preferably the value of the resistive element is of the order of the surge impedance of the wave guide transmission system. The remaining resistive element is connected through suitable power measuring instruments to a calibrated power source.

Heat will be generated in the first resistive element disposed within the first wave guide section by currents induced therein by the super-high-frequency field in the wave guide. The resultant heat will expand the gas in the capillary tube and tend to displace a mercury column therein an amount proportional to the heat generated in the resistive element. The calibrated power or voltage source connected to the second resistor is then adjusted until heat generated by the second resistor neutralizes the displacement of the mercury column caused by the heat generated by the first resistor. The power absorbed by the first resistor from the wave guide section may then be determined directly from the amount of power, indicated by the power indicating apparatus, required to neutralize this effect.

The second embodiment of the invention comprises means for absorbing energy from a wave guide transmission section by means of a liquid, for example water, which is circulated through an insulated portion of the wave guide system. The section of the guide enclosing the circulated liquid is matched to the remainder of the wave guide transmission system by means of an insulating partition of suitable composition and thickness. An increase in the temperature of the liquid due to energy absorbed from the wave guide transmission system is indicated as a function of the voltage generated by a thermopile inserted within the liquid chamber. A galvanometer connected to the thermopile may be calibrated in terms of the super-high-frequency power absorption in the circulating water system by means of a resistor immersed within the circulating water to which known electric power may be applied.

Among the objects of the invention is to provide an improved method of and means for measuring super-high-frequency energy. Another object of the invention is to provide an improved method of and means for measuring super-high-frequency energy transmitted by a wave guide transmission system. A further object of the invention is to provide an improved method of and means for measuring power in a super-high-frequency wave guide transmission system by means of indicating apparatus responsive to heat generated in a resistive element inserted within the wave guide for absorbing energy therefrom.

An additional object of the invention is to provide an improved method of and means for measuring super-high-frequency power in a wave guide transmission system wherein the energy in said wave guide is absorbed by a suitable liquid enclosed by a portion of said guide, and the temperature rise of said liquid in response to said absorbed energy is indicated thermoelectrically to provide indications of the absorbed power. A further object of the invention is to provide an improved method of and means for measuring power in a super-high-frequency wave guide transmission system wherein power absorbed in the form of heat by the measuring apparatus provides indications which may be calibrated by externally adjustable power measuring means.

Figure 2:
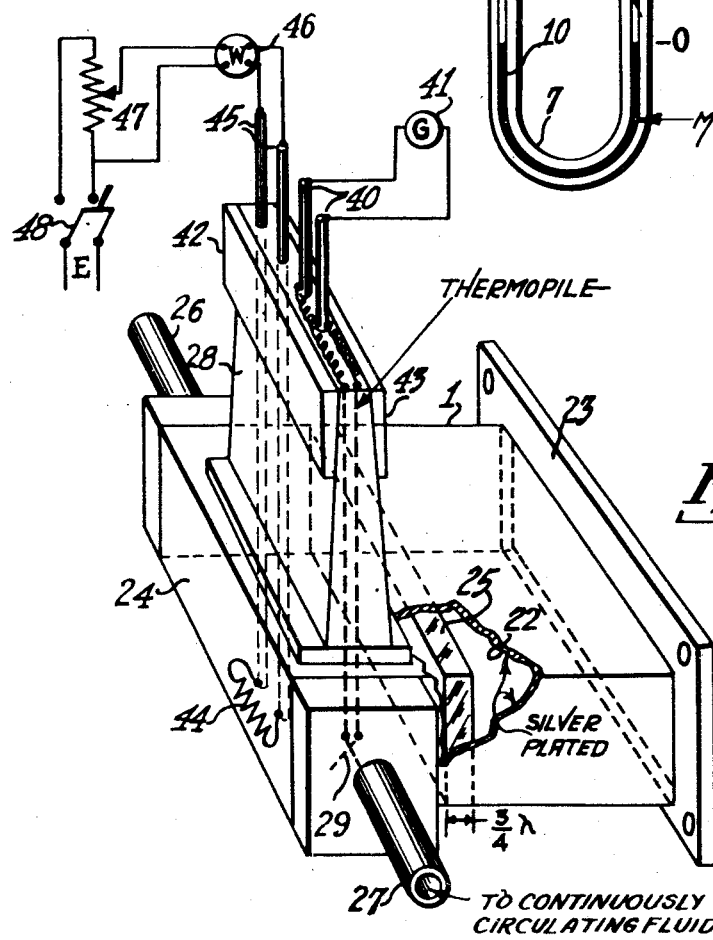

The invention will be further described by reference to the accompanying drawing of which Figure 1 is a schematic diagram of one embodiment, and Figure 2 is a schematic diagram of a second embodiment thereof. Similar characters are applied to similar elements throughout the drawing.

Referring to Figure 1, a wave guide section 1 having oppositely disposed apertures 2, 3 in the wide parallel faces 4, 5 thereof, includes a flanged portion 6 adapted for engagement with a similar flanged portion of a conventional rectangular wave guide transmission system. A U-shaped capillary tube 7 includes a first hollow blown portion 8 terminating one end thereof, and a second hollow blown portion 9 terminating the remaining end thereof. The capillary portion of the U-tube 7, intermediate the blown portions 8, 9, includes a mercury column 10.

The first blown portion 8 of the capillary tube 7 encloses a resistive element 11 having a resistance of the order of the surge impedance of the wave guide section. The second blown portion 9 of the U-tube 7 encloses a second resistive element 12, which is connected through a current indicating meter 13 and a variable resistor 14 to a source of calibrating voltage, not shown. A voltage indicating meter 15 is connected across the current indicating meter 13 and the second resistor 12. Instead of indicating separately the voltage and current, the indicator may be a wattmeter as shown in Fig. 2.

The first resistive element 11 preferably has a length substantially equivalent to one-half wavelength at the operating frequency of the wave guide transmission system, whereby the element functions as an antenna for absorbing energy from the wave guide when it is inserted through the apertures 2, 3 into the interior of the guide.

Heat generated in the first resistive element 11, by means of the high frequency energy absorbed from the wave guide, provides expansion of the gases in the end of the U-tube terminated by the first blown portion 8 thereby tending to displace the mercury column 10. The calibrating power applied to the second resistive element 12 may be varied by the variable resistor 14 to provide suitable heating of the second resistor 12 for neutralizing the displacement of the mercury column 10. The product of the current and voltage indicated by the current indicating meter 13 and the voltage indicating meter 15 will, therefore, be a measure of the power absorbed from the first resistor 11 from the wave guide transmission system. The first resistive element 11 is substantially resonant due to its physical dimensions, and has an impedance substantially equal to the surge impedance of the wave guide transmission system, hence substantially all of the energy available in the wave guide transmission system is absorbed by the resistive element. Therefore, the power indicated by the product of the readings on the indicating meters 13 and 15 will provide a substantially accurate indication of the total power transmitted by the wave guide.

In Figure 2 a wave guide section 1, comprising insulating walls having a silver plated layer 22 on the interior surfaces thereof, includes a flanged portion 23 adapted for engagement with a similar flanged portion of a conventional rectangular wave guide transmission system. Preferably the silver plated coating on the interior of the wave guide should extend over the surface 23 which engages with the complementary portion of the wave guide transmission system. The end of the wave guide section 1 remote from the flanged portion 23 is terminated in an enclosed insulating cavity 24 which is separated from the remainder of the wave guide section by means of an insulated partition 25. Provision is made for circulating water, or other energy absorptive fluids, through the insulated cavity 24 by means of the inlet and outlet pipes 26, 27, respectively. The thickness of the insulated partition 25, separating the water compartment 24 from the remainder of the wave guide section 1, may be of the order of three-quarters wavelength at the super high operating frequency, to provide for effective impedance matching between the guide dielectric and the water or other fluid power absorptive medium. An insulated projecting portion 28 extends from one side of the water compartment 24 for terminating the electrical connections to, and for enclosing, a thermopile 29 which is disposed within the circulating fluid power absorptive medium.

Heat generated in the power absorptive fluid within the fluid chamber 24 provides corresponding voltages at the terminals 40 of the thermopile 29 which may be connected to a suitable galvanometer 41. Relatively heavy metallic plates 42, 43 may be disposed adjacent the thermopile terminals 40 to provide effective heat transfer for the cold junction of the thermopile 29.

In order to calibrate the readings of the galvanometer 41 in terms of the super-high-frequency power absorbed from the wave guide transmission system by the circulating power absorptive fluid, a calibrating heater resistor 44 is disposed within the circulating fluid chamber 24. The heater 44 is connected to heating terminals 45, which are connected through a wattmeter 46, a variable resistor 47 and a power switch 48 to a source of power, not shown.

After an indication has been obtained upon the galvanometer 41 in response to energy absorbed directly by the circulating water system from the wave guide transmission system, the source of super-high-frequency energy may be interrupted by external means, not shown, and the variable resistor 47 may be adjusted to control the current through the heater resistor 44 thereby to provide an equal indication upon the galvanometer which may be calibrated in terms of the reading on the power indicating instrument 46. It should be understood that the fluid circulation should be maintained at a substantially constant rate during the energy measurement and calibration intervals.

It should be understood that the particular mechanical construction of the embodiments of the invention described are purely illustrative and that there may be various modifications thereof within the spirit and scope of the invention. It should further be understood that the system may be employed for measuring the power of continuous, damped, interrupted or pulsed wave energy, providing the modulation characteristics are taken into consideration in calibrating the electrical power applied to the auxiliary compensating or calibrating resistive element.

I claim as my invention:

1. Apparatus for measuring super-high frequency energy transmitted by a wave guide comprising a hollow dielectric substantially closed chamber having an impedance matching dielectric window therein, said window having a thickness of the order of three quarters wavelength at the operating frequency, and having cross-sectional dimensions of the order of the cross-sectional dimensions of said wave guide, said chamber having a wave guide connecting portion comprising a hollow dielectric shell including a conductive coating on the surfaces thereof interposed between the end of said wave guide and the windowed portion of said chamber, means for circulating a super-high frequency energy absorptive liquid through said chamber, energy translating means disposed within said chamber for generating electrical energy in response to temperature variations in said liquid due to super-high frequency energy absorbed thereby, and means responsive to said electrical energy for indicating the super-high frequency energy absorbed by said liquid.

2. Apparatus of the type described in claim 1 including resistive means disposed within said liquid, an adjustable source of voltage for selectively energizing said resistor to heat said circulating liquid, and calibrated means for adjusting said source to vary the temperature of said liquid for calibrating said super-high frequency energy indicating means.

3. Apparatus for measuring super-high frequency energy transmitted by a waveguide comprising a hollow dielectric substantially closed chamber having an impedance matching dielectric window therein, said window having a thickness of the order of an odd quarter wavelength at the operating frequency, said chamber having a waveguide connecting portion surrounding said window, means for circulating a super-high frequency energy absorptive liquid through said chamber, energy translating means disposed within said chamber for generating electrical energy in response to temperature variations in said liquid due to super-high frequency energy absorbed thereby, and means responsive to said electrical energy for indicating the super-high frequency energy absorbed by said liquid.

JOHN EVANS.

REFERENCES CITED

The following references are of record in the file of this patent:

UNITED STATES PATENTS

| Number | Name | Date |
| --- | --- | --- |
| 947,092 | Babcock | Jan. 18, 1910 |
| 1,859,469 | Richardson | May 24, 1932 |
| 1,039,925 | Gati | Oct. 1, 1912 |
| 2,284,379 | Dow | May 26, 1942 |
| 1,957,454 | Gebbard | May 8, 1934 |
| 2,088,749 | King | Aug. 3, 1937 |
| 2,219,653 | Krugel | Oct. 29, 1940 |
| 2,262,134 | Brown | Nov. 11, 1941 |
| 2,212,211 | Pfund | Aug. 20, 1940 |
| 2,282,480 | Keeler | May 12, 1942 |
| 2,398,606 | Wang | Apr. 16, 1946 |